(12) United States Patent
Puvvada Sathyanarayana et al.

(10) Patent No.: US 11,410,390 B2
(45) Date of Patent: Aug. 9, 2022

(54) AUGMENTED REALITY DEVICE FOR VISUALIZING LUMINAIRE FIXTURES

(71) Applicant: SIGNIFY HOLDING B.V., Eindhoven (NL)

(72) Inventors: Sanjeev Kumar Puvvada Sathyanarayana, Bangalore (IN); Sanjay Bhat, Bangalore (IN); Pramod Kukhshal, Bangalore (IN)

(73) Assignee: SIGNIFY HOLDING B.V., Eindhoven (NL)

( * ) Notice: Subject to any disclaimer, the term of this patent is extended or adjusted under 35 U.S.C. 154(b) by 487 days.

(21) Appl. No.: 15/739,799

(22) PCT Filed: Jun. 10, 2016

(86) PCT No.: PCT/EP2016/063366
§ 371 (c)(1),
(2) Date: Dec. 26, 2017

(87) PCT Pub. No.: WO2016/206997
PCT Pub. Date: Dec. 29, 2016

(65) Prior Publication Data
US 2018/0197339 A1    Jul. 12, 2018

(30) Foreign Application Priority Data

Jun. 23, 2015  (EP) .................................. 15173350

(51) Int. Cl.
*G06T 19/00* (2011.01)
*G06Q 30/06* (2012.01)
*G06V 20/20* (2022.01)

(52) U.S. Cl.
CPC ....... *G06T 19/006* (2013.01); *G06Q 30/0643* (2013.01); *G06V 20/20* (2022.01); *G06T 2210/04* (2013.01)

(58) Field of Classification Search
None
See application file for complete search history.

(56) References Cited

U.S. PATENT DOCUMENTS 9,552,674 B1 *  1/2017  Jayadevaprakash .................... G06T 19/006
2011/0148935 A1  6/2011  Arrasvuori
(Continued)

OTHER PUBLICATIONS

Schinke, Torben, et al., "Visualization of Off-Screen Objects in Mobile Augmented Reality," MOBILEHC1, Sep. 2010 (4 Pages).
(Continued)

*Primary Examiner* — Hilina K Demeter (57) ABSTRACT

The invention provides an augmented reality device and method for assisting a user in choosing appropriate luminaire fixtures to install within their home. A user may point the camera of a mobile device toward the region or location in a room where a new luminaire is desired, and based upon data generated by an orientation determination means included within the device, an appropriate luminaire or luminaire category is selected automatically for the user from a stored catalogue or database. Once an appropriate luminaire has been chosen, it is inserted within an image captured by the camera to generate an augmented reality image depicting the luminaire fixture in place within the user's room.

17 Claims, 5 Drawing Sheets

(56) References Cited

U.S. PATENT DOCUMENTS

| | | | |
|---|---|---|---|
| 2011/0219339 A1* | 9/2011 | Densham | G06T 15/00 348/46 |
| 2012/0001939 A1 | 1/2012 | Sandberg | |
| 2012/0105475 A1 | 5/2012 | Tseng | |
| 2014/0105475 A1 | 4/2014 | Sato et al. | |
| 2014/0111544 A1 | 4/2014 | Hammond | |
| 2014/0132595 A1 | 5/2014 | Boulanger et al. | |
| 2014/0282162 A1 | 9/2014 | Fein et al. | |
| 2014/0282220 A1 | 9/2014 | Wantland et al. | |
| 2014/0285522 A1 | 9/2014 | Kim et al. | |
| 2014/0347394 A1* | 11/2014 | Padilla | G06Q 30/0643 345/633 |
| 2015/0029223 A1* | 1/2015 | Kaino | G09G 3/002 345/633 |
| 2015/0123966 A1* | 5/2015 | Newman | G06T 19/006 345/419 |
| 2015/0348324 A1* | 12/2015 | Vaughn | G06T 19/003 345/633 |

OTHER PUBLICATIONS

Yovcheva, Zornitza, et al., "Towards Meaningful Augmentation of The Cityscape: New Challenges for Mobile GEOHCI," GEOHCI Workshop at CHI 2013 (3 Pages).

Mike Eissele et al., "Orientation as an Additional User Interface in Mixed-Reality Environments," Workshop Erweiterte Und Virtulee Reality, Dec. 2004, Retrieved From the Internet: URL:https://www.visus.unistuttgart.de/uploads/tx_vispublications/givrar04-eissele.pdf on Feb. 19, 2016 (12 Pages).

Tatu Harviainen et al., "Camera-Based Interactions for Augmented Reality," Advances in Computer Entertainment Technology, Oct. 2009 (4 Pages).

https://baijiahao.baidu.com/s?id=1594647896450973502; "Full Interpretation of AR Augmented Reality Technology", Mar. 11, 2018, pp. 1-14.

* cited by examiner

AUGMENTED REALITY DEVICE FOR VISUALIZING LUMINAIRE FIXTURES

CROSS-REFERENCE TO PRIOR APPLICATIONS

This application is the U.S. National Phase application under 35 U.S.C. § 371 of International Application No. PCT/EP2016/063366, filed on Jun. 10, 2016, which claims the benefit of European Patent Application No. 15173350.8, filed on Jun. 23, 2015. These applications are hereby incorporated by reference herein.

FIELD OF THE INVENTION

This invention relates to a device and method for generating augmented reality images.

BACKGROUND OF THE INVENTION

The consumer luminaire business depends upon the provision to consumers of tens and hundreds of individual SKUs (stock keeping units). This is especially true for the decorative lighting industry. This business category thrives on variety and the number of options it provides to its consumers. While this provides freedom to choose the right option, the decision making can become cumbersome, since in shopping and buying for their lighting, a consumer is required to take the trouble to visualize how each given prospective luminaire might look when installed within their home environment.

This difficulty has recently been recognized by a number of retailers and attempts made to remedy it through the development and implementation of Augmented Reality technologies, which allow a consumer to visualize how a certain product may look in their home. One example is the e-catalogue provided by IKEA for its furniture products. These solutions allow overlays of luminaires to be inserted within images captured by the camera of a mobile device such as a smartphone or tablet computer. This can be used to provide real-time rendering of the luminaire in the actual space where a customer is considering installing it.

While these technologies provide a greatly improved consumer experience for making purchase decisions, there remain significant inadequacies with state of the art solutions. In particular, an electronic product catalogue may typically comprise hundreds or even thousands of available luminaire fixtures and options, divided into perhaps dozens of different categories (e.g. ceiling pendant, wall mounted, table lamp, desk lighting, spot lighting etc.) This makes it a daunting task for a consumer to use the technology efficiently to make choices about their lighting purchases. A consumer must manually select which of the various categories is most appropriate for the particular location within the room at which they are considering installing a luminaire. This can be confusing and time-consuming for a customer who has no particular specialist knowledge of the different types of luminaire fixture which are available. Moreover, in order to facilitate the user selection of a particular luminaire category, multiple categories of luminaire must be fetched and downloaded to the mobile device at once, placing great demands on the processing resources of the device as well as the network bandwidth.

US 2014/0347394 discloses an augmented reality system for light fixture selection, in which augmented reality targets are provided. The targets are self-illuminated to enable easy recognition.

Desired therefore is an augmented reality solution for visualizing luminaire fixtures in situ within a room, but which simplifies the process for users of selecting appropriate luminaire fixtures to visually sample for a given application or mounting location within a room.

SUMMARY OF THE INVENTION

The invention is defined by the claims.

According to an aspect of the invention, there is provided a mobile device, comprising:
a display panel;
a camera adapted to capture an image;
an orientation determination sensor; and
a processor, the processor adapted to:
select a virtual image of a luminaire fixture from among a stored set of virtual luminaire images at least partly on the basis of data generated by the orientation determination sensor,
generate an augmented reality image by combining the selected virtual image of a luminaire fixture with the image captured by the camera, and
control the display panel to display the generated augmented reality image.

The processor may be adapted to generate the augmented reality image by overlaying the virtual image of a luminaire fixture at a target location within the camera image.

The orientation determination may comprise for example a software sensor or a hardware sensor.

A software-based sensor might include for example an image processing capability comprised by the processor or a separate processing element, for analyzing images captured at the camera to identify certain features contained within the image which may be used to give an indication of an orientation state of the mobile device. The features might include common household or office objects for instance whose typical relative vertical positioning within a room is known. Identification of one of said objects within a field of view of the camera, may allow determination of the orientation of the mobile device. Any other suitable software-based sensor may also be contemplated. It may also include recognition of people and their posture, which can again provide indication of locations and orientations.

A hardware based sensor may include for example one or more physical sensors adapted to capture mechanical or dynamical data pertaining to the motion or orientation/position of the mobile device.

According to at least one set of examples, the orientation determination sensor may comprise an inertial sensor.

An inertial sensor may include for example one of a gyroscope (e.g. an inertial gyroscope or a MEMS gyroscope) or an accelerometer. The camera of the mobile device may be pointed by the user toward the particular area or position within a space or room where they wish to visualize a luminaire in position. The camera may be solidly attached and integrated within the mobile device, and hence the orienting of the camera in the direction of the desired luminaire fixture location generates a correlated output response from the inertial sensor, which is related to the particular mechanical or dynamical effects of either the event or process of re-orienting the device, or simply of the final static orientation state itself. These output responses, or the output(s) of any other example orientation determination sensor, may be analyzed by the processor and used in identifying and selecting at least a particular category of luminaire which may be appropriate for the user's intended installation location.

In particular, the processor may be adapted to determine an orientation state of the device on the basis of the data from the orientation determination sensor, and to select the virtual image of a luminaire fixture at least partly on the basis of the determined orientation state of the device. In this way, embodiments of the device are able to achieve context specific loading (upfront fetching) based on the orientation of the computing device.

For example, the processor may be adapted to determine from the orientation state at what elevation level within the room the user is intending to install a luminaire. The determined elevation level of the desired luminaire location may allow determination of an appropriate style or category of luminaire to select from the stored set. For instance, if the mobile device is in an orientation state commensurate with the camera being directed at the level of a table, or desk, the processor may be configured to select one or more table or desk lamps for overlaying within the captured image. If the mobile device is in an orientation state commensurate with the camera being directed at the ceiling, for instance, the processor may be configured to select one or more ceiling spot or pendant lamps.

The mobile device may further comprise a user input element adapted to generate output signals in response to user input commands, and the processor may be adapted to select a virtual image of a luminaire fixture by:

selecting a subset of virtual luminaire fixture images from among the stored set of luminaire fixture images on the basis of data generated by the orientation determination sensor, and selecting a virtual image of a luminaire fixture from among the selected subset on the basis of output signals from the user input element.

The selected subset may correspond to a particular category of possible mounting location for a luminaire fixture within a room, for example. Input from the user may then be used to select one of the subset to render within the captured image for visualization. The user may be presented with a subset of luminaire options determined on the basis of, for example, a determined orientation state of the mobile device, and may then indicate, by means of the user input element, which one of the subset they would like to sample.

The category of possible mounting location may correspond to a particular elevation category within a room, for example.

The processor may be adapted to control the display panel to display a subgroup of the selected subset of virtual luminaire fixture images. From the displayed images, the user can make a decision about which to insert into an augmented reality image for visualization.

The members of the subgroup which the control panel is controlled to display may be determined by the processor at least partly on the basis of output signals from the user input element. The user may decide for example to replace all of the members of the subgroup with new virtual images from the same subset. This may for example correspond to 'scrolling' or otherwise navigating through a virtual list of the luminaires in the subset.

The stored virtual images of luminaire fixtures may be stored externally to the mobile device, and the processor may be adapted to generate the augmented reality image by downloading the selected virtual image from said externally stored virtual images. In these cases, processing resource or bandwidth may be conserved compared to prior art solutions, since only the virtual image(s) selected by the processor need be downloaded. The processor is effectively able to filter the total set of virtual images and download, for availability to the user, only those which are appropriate for the particular location at which the user desires to install a luminaire.

According to a further aspect of the invention, there is provided a method of visualizing luminaire fixtures within a room using a mobile device, the mobile device comprising:

a display panel;
a camera; and
an orientation determination sensor,
the method comprising:
capturing an image using the camera;
capturing data generated by the orientation determination sensor;
selecting a virtual image of a luminaire fixture from among a stored set of virtual images at least partly on the basis of the data captured from the orientation determination sensor;
generating an augmented reality image by combining the selected virtual image of a luminaire with the image captured by the camera, and
controlling the display panel to display the generated augmented reality image.

Generating the augmented reality image may comprise overlaying the virtual image of a luminaire fixture at a target location within the camera image.

The method may further comprise determining an orientation state of the mobile device on the basis of the data captured from the orientation determination sensor, and selecting the virtual image of a luminaire fixture at least partly on the basis of the determined orientation state of the device.

The mobile device may further comprise a user input element adapted to generate output signals in response to user input commands, and the selecting of a virtual image of a luminaire fixture may comprise:

selecting a subset of virtual luminaire fixture images from among the stored set of luminaire fixture images on the basis of data captured from the orientation determination sensor, and selecting a virtual image of a luminaire fixture from among the selected subset on the basis of output signals from the user input element.

The method may further comprise controlling the display panel to display a subgroup of the selected subset of virtual luminaire images.

In examples, the method may further comprise determining the members of the subgroup which the control panel is controlled to display at least partly on the basis of output signals from the user input element.

The method steps may be implemented by a computer program running on a processor of the mobile device, i.e. a dedicated application which is loaded onto the mobile device.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an augmented reality device and method for assisting a user in choosing appropriate luminaire fixtures to install within their home. A user may point the camera of a mobile device toward the region or location in a room where a new luminaire is desired, and based upon data generated by an orientation determination sensor included within the device, an appropriate luminaire or luminaire category is selected automatically for the user from a stored catalogue or database. Once an appropriate luminaire has been chosen, it is inserted within an image captured by the camera to generate an augmented reality image depicting the luminaire fixture in place within the user's room.

Below are described a variety of example embodiments, each of which relate in particular to example mobile devices comprising an inertial sensor for determining an orientation state of the device. However it will be understood, as discussed above, that these represent just one possible set of solutions, and the invention is not to be understood as limited to such embodiments. In each case, the inertial sensor may alternatively be substituted for any suitable orientation determination sensor, including both hardware based sensor and software based sensor.

Software based sensor might include for instance image processing features for providing orientation determination on the basis of analysis of one or more images captured by the camera. Any other suitable software sensor may also be used.

Alternative hardware sensor may include for example any suitable sensor or set of sensors capable of generating data based on mechanical or dynamical events or properties pertaining to the mobile device.

Figure 1:
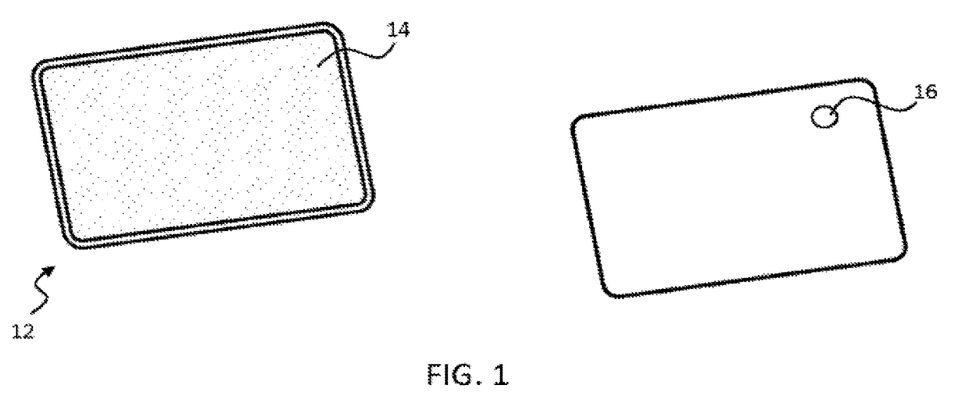
FIG. 1 schematically depicts a simple example of a mobile device.

In FIG. 1 is illustrated a simple example of a mobile device 12 in accordance with embodiments of the invention. The device comprises a display panel 14 disposed on a first (front) surface, and comprises a camera element 16, having a lens mounted through a second (rear) surface. The mobile device also comprises an inertial sensor and a processor unit, mounted within the interior of the device (not shown in FIG. 1).

The mobile device may, in examples, comprise a tablet computer, a smartphone or a wearable smart device, such as smart glasses, or a smart wrist device. These examples however are noted by way of illustration only, and it will be understood that any portable or mobile computing device comprising a display panel, a camera, an inertial sensor and a processor may be used. Furthermore the term 'mobile device' is not to be understood as a limitation to communications or telephony devices in particular, but may comprise any mobile computing device.

The processor may be adapted to control the display panel 14 to display images captured by the camera 16 in real time, facilitating 'live' viewing by a user of the camera viewpoint. Embodiments of the invention utilize this functionality to generate and display 'live' augmented reality images, wherein a virtual image of a luminaire fixture is digitally inserted within real-time captured images of a scene in a room. In preferred embodiments, the virtual luminaire images are 3D images, allowing a true perspective view of the luminaire to be achieved at any orientation and position.

Although 'live' augmented image rendering offers the best user experience, in other examples, the augmented reality images may be single, still images generated from still images captured by the camera.

The inertial sensor may comprise, by way of non-limiting example, an accelerometer or a gyroscope. A gyroscope allows for a measuring and/or maintaining orientation, based on the principles of angular momentum. Data from either an accelerometer or a gyroscope may be used by the processor in determining or estimating a (3D) orientation state of the mobile device. When a user points the mobile device in a given direction, to image a particular area or location in a room, this generates a response in the inertial sensor which may be used to determine in which direction the mobile device is being pointed.

Based on this information, the processor may be configured to estimate at what elevation level within the room the viewpoint of the camera is directed, and to use this information to determine an appropriate category of luminaire to display to the user for installation at that elevation level. Many dozens of luminaire categories exist, including, by way of non-limiting example, floor uplighters, floor spot lamps, wall uplighters, desk lamps, table lamps, ceiling spot lamps and ceiling pendant lamps. For example, a determination that the camera viewpoint is directed at a floor level elevation of the room would indicate that floor lamps are appropriate. A mid-level elevation may indicate wall-lamps. Ceiling level might indicate either ceiling spot or pendant lamps, for example.

The determined orientation state might additionally allow more subtle analysis to be performed, for example determining not just the elevation level at which a user is contemplating installing a luminaire, but also a specific position or orientation at which the luminaire is desired to be installed. Such analysis may allow differentiation for example between a mobile device pointing at a region on the floor, or pointing to a point on the surface of a table, the two requiring different kinds of luminaire. The distinction may be deduced, for example, though the steepness of the pitch at which the mobile device is held oriented toward the target point in question.

Once an appropriate category of luminaire has been determined, the processor may be adapted to access a catalogue or database (or other storage medium) containing virtual images of an available set of luminaires, and to select from said catalogue or database one or more luminaire images of the appropriate category. In some examples, the processor may be configured to select just one luminaire image of the appropriate category, either randomly, or based on some further processing steps, and to construct an augmented reality image using said selected image. In other examples, the processor may be adapted to select a plurality of virtual images of the appropriate category, and to further seek user input, by means of a user input element, as to which of the plurality to use in constructing an augmented reality image. For example, the display panel 14 may be controlled to display the plurality of images to the user, or a subgroup of the plurality of images and the processor configured to receive commands from a user input element to indicate which of the displayed images to select for inclusion within an augmented reality image.

A user input element might be incorporated within the display panel 14 in the form of a touch-screen display panel. However, in alternative examples, the user input element may comprise physical buttons disposed on or in the casing of the device. A user input element might also comprise a voice recognition element or a gesture recognition element for example.

The database or catalogue of virtual luminaire images may be stored within a storage unit comprised by the mobile device itself, or may be stored externally to the mobile device and accessed via a network or internet connection. In the latter case, the processor is adapted to download each of the selected images or plurality of images from the external storage medium in order to construct the augmented reality image or to display a selected group of images to a user.

Figure 2:
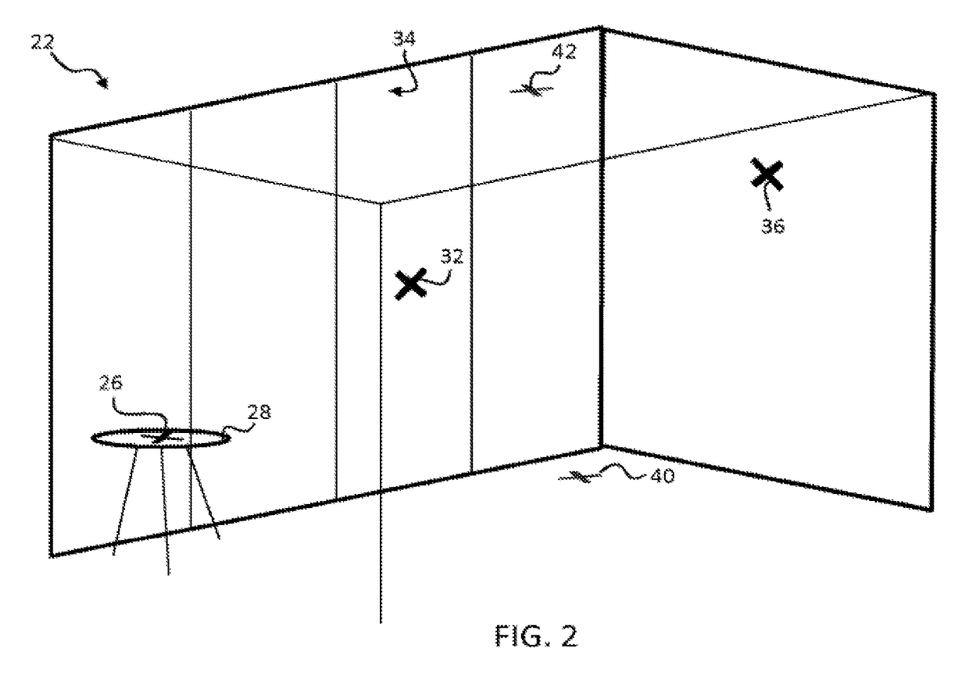
FIG. 2 schematically depicts an illustrative example of a room layout.

To illustrate the concept of the invention, FIG. 2 depicts a schematic example of the interior layout of a room 22 in which embodiments of the invention may be applied. Within the example room are depicted five example target locations 26, 32, 36, 40, 42 for the possible mounting of a different category of luminaire, each target location represented by a superposed 'X' sign. The first target location 26 is on the surface of a side table 28. The second target location 32 at the mid-level of a wall portion 34. The third target location 36 is at a higher level on a second wall, disposed at an angle to the first. The fourth target location 40 is on the floor, at a corner of the room. The fifth target location 42 is on the ceiling of the room. The chosen target locations are merely examples of particular positions at which a user may have a desire to install a luminaire, and by no means constitute a limiting set of possible target locations.

Figure 3A:
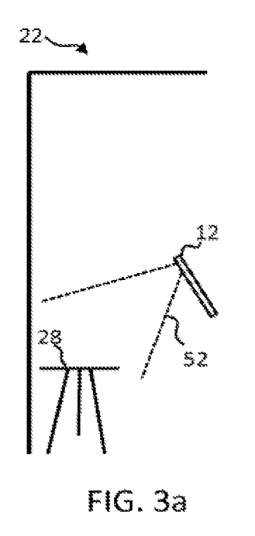
FIGS. 3a-3c schematically depict an example mobile device in three different orientation states within the room, for visualizing luminaire fixtures in three different room locations.
Figure 3B:
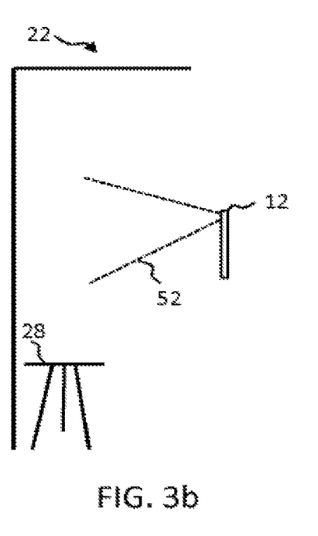
Figure 3C:
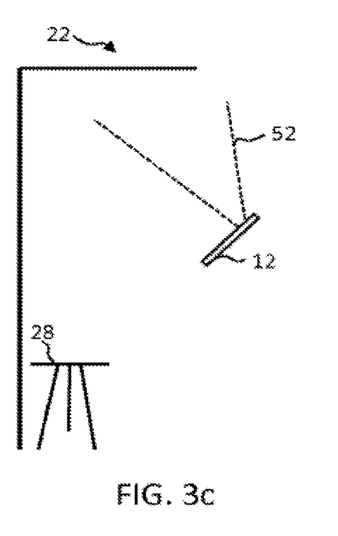

In FIGS. 3*a*-*c* are depicted schematic side-views of the room 22 in which a mobile device is shown oriented in three different directions, thereby capturing within a field of view 52 of the camera three different target luminaire locations. In FIG. 3*a*, a user has pointed the mobile device 12 downward toward the target location 26 on the surface of the side table 28. In this state, the device is oriented at approximately 30° to the vertical plane. In FIG. 3*b*, a user has pointed the camera 16 of the mobile device straight ahead toward the second target point 32 on the wall portion 34. In this state, the device 12 is oriented parallel with the vertical plane. In FIG. 3*c*, the user has held and pointed the device upward toward the third target point 42 on the ceiling of the room. In this state, the device is oriented at around 45° to the vertical plane (or 315° using a metric continuous with that used for the first target location).

It will be understood that various more complex orientation states will inevitably be realized during real-world use of the device, including orientation levels around all three Cartesian axes, rather than just one axis, as in the three present examples. These examples are chosen to provide merely a simple demonstration of the underlying concept.

Figure 4:
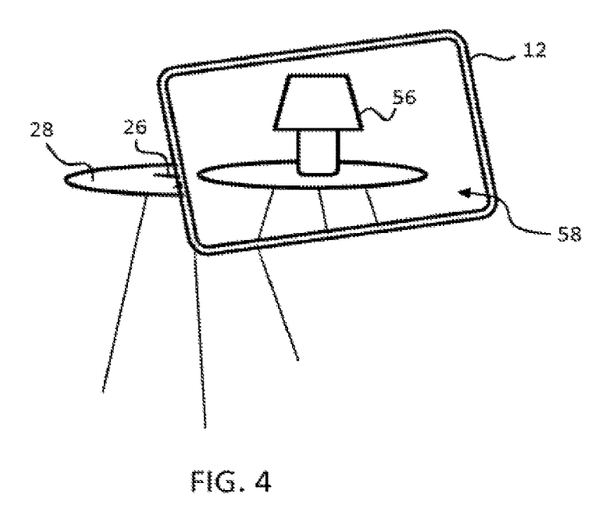
FIG. 4 schematically depicts a profile view of an example mobile device in the first orientation state, generating an augmented reality image.

In FIG. 4 is depicted a perspective view of the mobile device in the orientation state shown in FIG. 3*a*, wherein the user has pointed the device downward toward the side table 28. On pointing the device downward toward the table, the inertial sensor generates an output from which the processor may determine the 3D orientation state of the device. On determining that the device is oriented at approximately 30° to the vertical plane, the processor may then determine on the basis of this information that the corresponding elevation level of the camera field of view 52 is commensurate with the level of a table or desk. A 'table lamp' luminaire category may then be selected by the processor and one or more virtual images of table lamp luminaires accessed. Either on the basis of user input, or further processing steps, a single luminaire virtual image 56 from the determined category is selected and is combined with the captured camera image to generate and display an augmented reality image 58 on the display panel 14 of the device. The augmented reality image shows the selected luminaire 56 positioned on the table.

The determining of an appropriate luminaire category on the basis of the determined orientation state may be performed, for example, by means of examination of an internally or externally stored look-up table, for example, in which particular 3D orientations of the device are matched or associated with certain categories of luminaire. These associations may be device-specific, such that a mobile device having different outer dimensions, and/or having a camera mounted in a different position within its external casing, for example, would require the entries of the look-up table to be adjusted. This might be performed in advance for each mobile device, or might be performed by a user through a calibration process, for example.

The generation of the augmented reality image, through combining the stored virtual image with the captured camera image, may comprise, in examples, an additional process of digital manipulation or adjustment of the virtual image after retrieval from the internal or external storage medium. These manipulations might include, for example, a re-scaling of the image, or a re-orientation of the image before insertion within the captured camera image. The manipulations or adjustments may, in some cases, be made in dependence upon one or more visual features detected within the captured image.

For example, the processor may be adapted to recognize or identify one or more features within the captured image, to determine a location and/or orientation of the one more recognized features, and to re-orient and/or re-position the virtual image within the camera image in dependence upon this information. The features may give clues as to at what angle the (3D) virtual image should be rendered, with what outer dimensions it should be rendered, and in what location within the camera image it should be positioned, for instance.

In the case of 'live' or real-time augmented image rendering, such adjustments might be performed continuously as the user moves the mobile device to slightly different positions and orientations, in order to maintain a consistent augmented view of the virtual luminaire 56 on the table.

The features may be extrinsic, artificially installed features, such as tags or markers, which the processor is configured to recognize in advance. The tags or markers may have a particular shape, or comprise a particular pattern which allows their presence within a captured image to be easily discerned. Alternatively the features may be intrinsic features of the room or space, the processor adapted to recognize these within the captured image. Intrinsic features might include, for example, wall boundaries, ceiling-wall boundaries, ceiling panels, ventilation panels or the angle or size or a table or desk surface within a captured image.

The particular features which the processor is configured to identify and use in making virtual image adjustments might be different for different determined luminaire categories. For example, once it is determined by the processor that the orientation of the mobile device is such that the field of view of the camera is falling at the elevation level of a table or desk, the processor may be adapted to switch to looking for a particular subset of intrinsic features specifically to do with table surfaces, boundaries, legs etc.

In alternative examples, dedicated markers or targets might be manually affixed by a user at desired locations within a room, to provide assistance in aligning and orienting the virtual image.

The features may act as alignment targets for the positioning of the virtual luminaire image within the camera image, i.e. the processor is adapted to recognize the features within the image, determine a location of the features within the image, and to subsequently position the virtual luminaire image in alignment with, or in coincidence with, the determined location of the feature.

Alternatively, the processor may be adapted to recognize certain features (intrinsic or artificial) as representing obstacles, and to adjust the positioning the virtual luminaire within the camera image so as to avoid overlap with said obstacles.

The processor may, in examples, be further adapted to adjust the 3D orientation of the virtual image in accordance with determined positions and or orientations of one or more features within the captured image. For example, the processor may be adapted to determine from the particular orientation and dimensions of an artificial tag or marker, the particular perspective at which the tag is being viewed by the camera and to adjust the orientation of the luminaire to fit with that perspective view.

Figure 5:
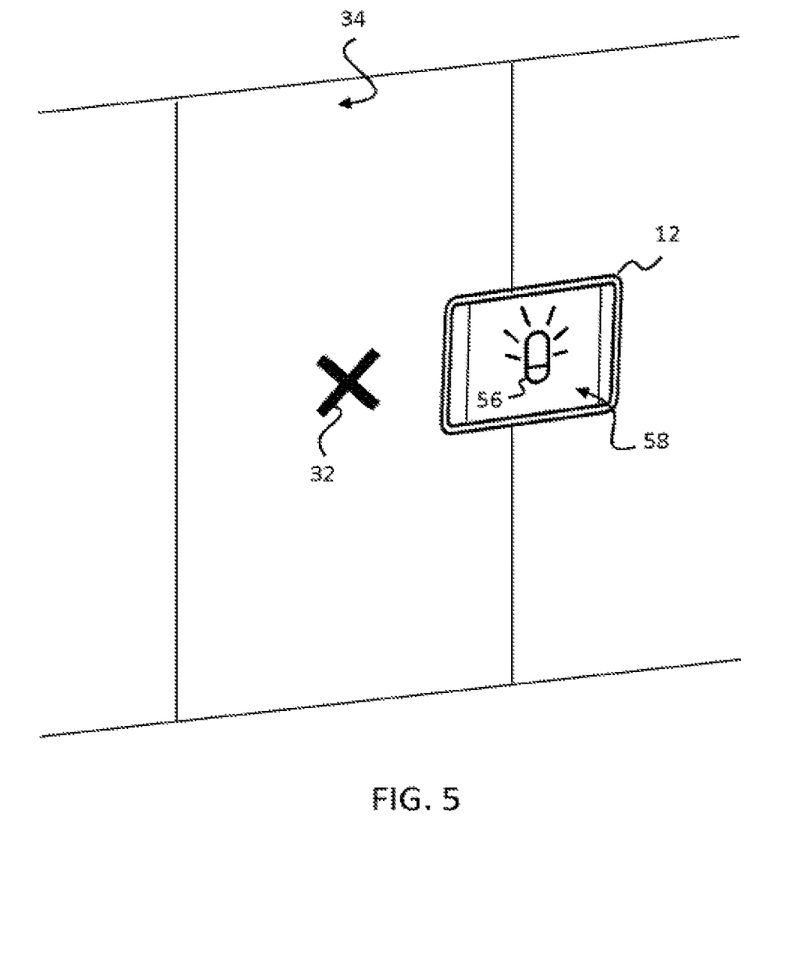
FIG. 5 schematically depicts a profile view of an example mobile device in the second orientation state, generating an augmented reality image.

In FIG. 5 is depicted a perspective view of the mobile device in the orientation state shown in FIG. 3b, wherein the device is directed straight ahead, toward the target location 32 in the middle of the wall portion 34. The processor determines that the device is oriented substantially parallel with the vertical plane and correspondingly identifies that the field of view of the camera is falling upon a central point of the wall portion 34. Based upon this, a 'wall-lamp' luminaire category is selected by the processor, and one or more virtual images of wall-lamp luminaires accessed.

Again, either on the basis of user input, or further processing steps, a single luminaire virtual image 56 from the determined category is selected and is combined with the captured camera image to generate and display an augmented reality image 58 on the display panel 14 of the device. The augmented reality image shows the selected luminaire superposed at a central point on the wall portion 34.

Figure 6:
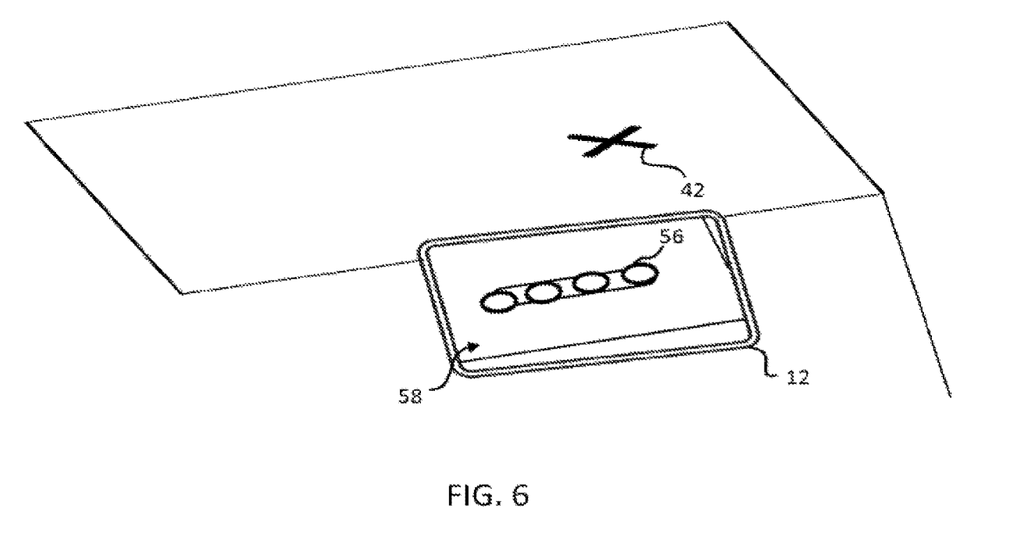
FIG. 6 schematically depicts a profile view of an example mobile device in the third orientation state, generating an augmented reality image; and, FIG. 7 illustrates a flow chart showing one example embodiment of the method of the present invention.

A final example is illustrated in FIG. 6, wherein a perspective view of the orientation state shown in FIG. 3c is depicted. A user has pointed the mobile device 12 upwards toward a target point 42 on the ceiling. Data from the inertial sensor within the mobile device allows the processor to determine that the mobile device is being oriented at approximately 315° to the vertical plane, and consequently that the field of view of the camera is concurrent with a ceiling-level elevation within the room. Accordingly, a 'ceiling-lamp' luminaire category is selected by the processor, and one or more virtual images of this category of luminaire are accessed and retrieved. On selection of a single luminaire image 56, through user input or processing, an augmented reality image 58 is rendered and displayed on the display panel 14, depicting the selected luminaire mounted at the target point 42 on the ceiling.

Figure 7:
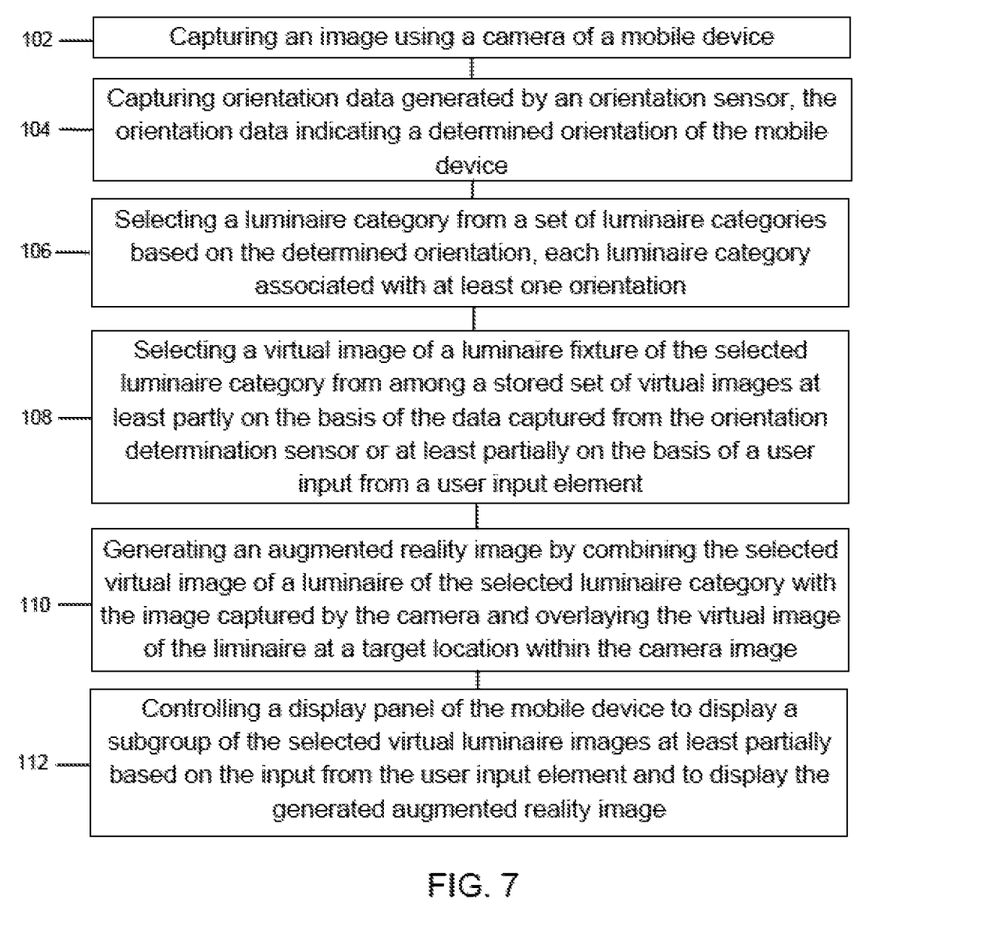

FIG. 7 illustrates the steps of a method according to one example embodiment of the present invention. The method steps include: capturing an image using a camera of a mobile device (step 102); capturing orientation data generated by an orientation sensor, the orientation data indicating a determined orientation of the mobile device (step 104); selecting a luminaire category from a set of luminaire categories based on the determined orientation, each luminaire category associated with at least one orientation (step 106); selecting a virtual image of a luminaire fixture of the selected luminaire category from among a stored set of virtual images at least partly on the basis of the data captured from the orientation determination sensor or at least partially on the basis of a user input from a user input element (step 108); generating an augmented reality image by combining the selected virtual image of a luminaire of the selected luminaire category with the image captured by the camera and overlaying the virtual image of the luminaire at a target location within the camera image (step 110); controlling a display panel of the mobile device to display a subgroup of the selected virtual luminaire images at least partially based on the input from the user input element and to display the generated augmented reality image (step 112).

As discussed above, embodiments make use of a processor for controlling the display and selection of images. The processor can be implemented in numerous ways, with software and/or hardware, to perform the various functions required. A processor typically employs one or more microprocessors that may be programmed using software (e.g., microcode) to perform the required functions. There may be a combination of dedicated hardware to perform some functions and a processor (e.g., one or more programmed microprocessors and associated circuitry) to perform other functions.

Examples of processor that may be employed in various embodiments of the present disclosure include, but are not limited to, conventional microprocessors, application specific integrated circuits (ASICs), and field-programmable gate arrays (FPGAs). In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A mobile device, comprising:
a display panel;
a camera adapted to capture an image;
an orientation determination sensor; and
a processor, the processor adapted to:
receive orientation data from the orientation determination sensor, the orientation data indicating a determined orientation of the mobile device,
automatically select a luminaire category from a set of luminaire categories based on the determined orientation of the mobile device and calibration data, each luminaire category associated with at least one orientation, wherein the calibration data corresponds to one or more dimensions of the mobile device and/or a position of the camera on the mobile device, display the selected luminaire category on the display panel, select a virtual image of a luminaire fixture of the selected luminaire category from among a stored set of virtual luminaire images, generate an augmented reality image by combining the selected virtual image of the luminaire fixture of the selected luminaire category with the image captured by the camera, control the display panel to display the generated augmented reality image, and receive a user input command from a user input element associated with a manipulation of the virtual image of the luminaire within the augmented reality image.

2. A mobile device as claimed in claim 1, wherein the orientation determination sensor comprises an inertial sensor.

3. A mobile device as claimed in claim 1, wherein the processor is adapted to generate the augmented reality image by overlaying the virtual image of the luminaire fixture at a target location within the camera image.

4. A mobile device as claimed in claim 1, wherein the processor is adapted to select the virtual image of the luminaire fixture by:

selecting a subset of virtual luminaire fixture images from among the stored set of luminaire fixture images on the basis of data generated by the orientation determination sensor, and selecting the virtual image of the luminaire fixture from among the selected subset on the basis of output signals from the user input element.

5. A mobile device as claimed in claim 4, wherein the selected subset corresponds to a particular category of possible mounting location for the luminaire fixture within a room.

6. A mobile device as claimed in claim 5, wherein the category of possible mounting location corresponds to a particular elevation category within the room.

7. A mobile device as claimed in claim 4, wherein the processor is adapted to control the display panel to display a subgroup of the selected subset of virtual luminaire fixture images.

8. A mobile device, as claimed claim 1, wherein the stored virtual images of luminaire fixtures are stored externally to the mobile device, and the processor is adapted to generate the augmented reality image by downloading the selected virtual image from said externally stored virtual images.

9. The mobile device of claim 1, wherein the virtual image of the luminaire fixture of the selected luminaire category from among the stored set of virtual luminaire images is selected randomly.

10. The mobile device of claim 1, wherein the virtual image of the luminaire fixture of the selected luminaire category is selected in response to a voice or a gesture input.

11. The mobile device of claim 1, wherein the manipulation of the virtual image includes at least one of: re-scaling, re-orienting, or repositioning the virtual image.

12. The mobile device of claim 1, wherein the determined orientation of the mobile device is at least one of a first orientation, a second orientation, or a third orientation wherein the first orientation corresponds with the camera of the mobile device being directed toward a ceiling; the second orientation corresponds with the camera of the mobile device being directed at a wall; and the third orientation corresponds to the camera of the mobile device being directed to a desk, table, or floor.

13. A method of visualizing luminaire fixtures within a room using a mobile device, the mobile device comprising:

a display panel;
a camera; and
an orientation determination sensor,
the method comprising:

capturing an image using the camera;

capturing orientation data generated by the orientation determination sensor, the orientation data indicating a determined orientation of the mobile device;

automatically selecting a luminaire category from a set of luminaire categories based on the determined orientation of the mobile device and calibration data, each luminaire category associated with at least one orientation, wherein the calibration data corresponds to one or more dimensions of the mobile device and/or a position of the camera on the mobile device, displaying the selected luminaire category on the display panel, selecting a virtual image of a luminaire fixture of the selected luminaire category from among a stored set of virtual images at least partly on the basis of the data captured from the orientation determination sensor;

generating an augmented reality image by combining the selected virtual image of the luminaire fixture of the selected luminaire category with the image captured by the camera, and controlling the display panel to display the generated augmented reality image, receiving a user input command from a user input element associated with a manipulation of the virtual image of the luminaire within the augmented reality image.

14. The method as claimed in claim 13, wherein generating the augmented reality image comprises overlaying the virtual image of the luminaire fixture at a target location within the camera image.

15. The method as claimed in claim 13, wherein the selecting a virtual image of the luminaire fixture comprises:

selecting a subset of virtual luminaire fixture images from among the stored set of luminaire fixture images on the basis of data captured from the orientation determination sensor, and selecting the virtual image of the luminaire fixture from among the selected subset on the basis of output signals from the user input element.

16. The method as claimed in claim 15, further comprising controlling the display panel to display a subgroup of the selected subset of virtual luminaire images and determining the members of the subgroup which the control panel is controlled to display at least partly on the basis of output signals from the user input element.

17. A computer program comprising non-transitory computer program code which is adapted, when run on a computer, to perform the steps of claim 13.

* * * * *